United States Patent
Paz Barahona et al.

(10) Patent No.: US 7,112,139 B2
(45) Date of Patent: Sep. 26, 2006

(54) GAMING MACHINE WITH AMBIENT NOISE ATTENUATION

(75) Inventors: Francisco Jose Paz Barahona, Arlington Heights, IL (US); Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 593 days.

(21) Appl. No.: 10/026,579

(22) Filed: Dec. 19, 2001

(65) Prior Publication Data
US 2003/0114214 A1 Jun. 19, 2003

(51) Int. Cl.
*A63F 13/00* (2006.01)

(52) U.S. Cl. .............. 463/35; 463/20; 381/57; 381/94.1; 381/71.1

(58) Field of Classification Search .......... 463/1, 463/30, 35, 46, 16–25; 381/71.1, 71.2, 71.6
See application file for complete search history.

(56) References Cited

U.S. PATENT DOCUMENTS

| | | | | |
|---|---|---|---|---|
| 3,533,629 A | | 10/1970 | Raven | 273/138 |
| 4,522,399 A | | 6/1985 | Nishikawa | 273/143 R |
| 5,133,017 A | * | 7/1992 | Cain et al. | 381/71.6 |
| 5,370,399 A | | 12/1994 | Liverance | 273/434 |
| 5,444,786 A | * | 8/1995 | Raviv | 381/71.14 |
| 5,450,494 A | * | 9/1995 | Okubo et al. | 381/57 |
| 5,469,510 A | * | 11/1995 | Blind et al. | 381/55 |
| 5,524,888 A | | 6/1996 | Heidel | 463/22 |
| 5,533,727 A | | 7/1996 | DeMar | 463/23 |
| 5,542,669 A | * | 8/1996 | Charron et al. | 463/13 |
| 5,655,961 A | | 8/1997 | Acres et al. | 463/27 |
| 5,666,426 A | * | 9/1997 | Helms | 381/57 |
| 5,689,572 A | * | 11/1997 | Ohki et al. | 381/71.3 |
| 5,695,188 A | | 12/1997 | Ishibashi | 273/143 R |
| 5,762,552 A | * | 6/1998 | Vuong et al. | 463/25 |
| 5,775,993 A | * | 7/1998 | Fentz et al. | 463/17 |
| 5,807,177 A | | 9/1998 | Takemoto et al. | 463/47 |
| 5,828,768 A | * | 10/1998 | Eatwell et al. | 381/333 |
| 5,833,538 A | | 11/1998 | Weiss | 463/21 |
| 5,851,148 A | * | 12/1998 | Brune et al. | 463/25 |
| 5,941,773 A | | 8/1999 | Harlick | 463/26 |
| 5,971,850 A | | 10/1999 | Liverance | 463/23 |
| 5,995,631 A | * | 11/1999 | Kamada et al. | 381/1 |
| 6,068,552 A | | 5/2000 | Walker et al. | 463/21 |
| 6,089,663 A | | 7/2000 | Hill | 297/258.1 |
| 6,110,041 A | | 8/2000 | Walker et al. | 462/20 |
| 6,162,121 A | | 12/2000 | Morro et al. | 463/16 |
| 6,254,483 B1 | | 7/2001 | Acres | 463/26 |

(Continued)

FOREIGN PATENT DOCUMENTS

AU 199943487 3/2000

(Continued)

OTHER PUBLICATIONS

Spotlight, Flip Flop Anchor Gaming. '00 Games (Jun. 2000).

(Continued)

*Primary Examiner*—John M. Hotaling, II
(74) *Attorney, Agent, or Firm*—Jenkens & Gilchrist

(57) ABSTRACT

A gaming machine in a gaming establishment enhances its game sounds by attenuating ambient noise in the establishment. The gaming machine includes a microphone, processing circuitry, and an audio speaker. The microphone detects ambient noise and generates a noise signal from the sensed ambient noise. The processing circuitry generates an anti-noise signal from the noise signal and adds the anti-noise signal to a game sound signal generated by the gaming machine to produce an output signal. The audio speaker is driven with the output signal.

14 Claims, 4 Drawing Sheets

U.S. PATENT DOCUMENTS

| | | |
|---|---|---|
| 6,302,790 B1 | 10/2001 | Brossard .................... 463/20 |
| 6,315,666 B1 | 11/2001 | Mastera et al. ............. 463/31 |
| 6,422,941 B1 | 7/2002 | Thorner et al. ............. 463/30 |
| 6,509,896 B1 * | 1/2003 | Saikawa et al. ........... 345/419 |
| 6,530,842 B1 * | 3/2003 | Wells et al. ................ 463/46 |
| 6,561,908 B1 | 5/2003 | Hoke ......................... 463/35 |
| 6,584,201 B1 * | 6/2003 | Konstantinou et al. ...... 381/57 |
| 6,638,169 B1 * | 10/2003 | Wilder et al. ............... 463/35 |
| 2002/0039919 A1 | 4/2002 | Joshi et al. ................. 463/20 |
| 2002/0090990 A1 | 7/2002 | Telischak et al. .......... 451/359 |
| 2002/0151349 A1 | 10/2002 | Joshi ......................... 463/20 |
| 2003/0117728 A1 * | 6/2003 | Hutzel et al. .............. 359/838 |
| 2004/0029637 A1 | 2/2004 | Hein, Jr. et al. ............ 463/35 |

FOREIGN PATENT DOCUMENTS

| | | | |
|---|---|---|---|
| GB | 2124048 | * | 2/1984 |
| JP | 5-31254 | | 2/1993 |
| JP | 10277213 A | * | 10/1998 |

OTHER PUBLICATIONS

Star Wars Video Slots, '03 Games (Sep. 2003).

* cited by examiner

GAMING MACHINE WITH AMBIENT NOISE ATTENUATION

FIELD OF THE INVENTION

The present invention relates generally to gaming machines and, more particularly, to a gaming machine that enhances its game sounds by attenuating ambient noise produced by the surrounding environment.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator.

To enhance the entertainment value of gaming machines, many gaming machines plays entertaining game sounds coordinated with images and graphics shown on the machine display. The game sounds are transmitted by one or more audio speakers mounted to the gaming machine. The speakers may be aimed in a frontal direction generally toward a player situated in front of the machine, or in a side ways direction generally perpendicular to the frontal direction.

Gaming machines are typically situated in noisy environments such as casinos, race tracks, and other gaming establishments. The ambient noise produced by such environments may interfere with the entertaining game sounds played by the gaming machines. The interference from the ambient noise may degrade and make it difficult to hear the game sounds. Although a gaming operator may compensate for the ambient noise by increasing the machine's sound volume, the volume if too loud may annoy the player and others nearby and may exacerbate, instead of alleviate, the problem of ambient noise.

Accordingly, a need exists for a gaming machine that effectively enhances its game sounds by minimizing interference from ambient noise produced by the surrounding environment.

SUMMARY OF THE INVENTION

A gaming machine in a gaming establishment enhances its game sounds by attenuating ambient noise in the establishment. The gaming machine includes a microphone, processing circuitry, and an audio speaker. The microphone detects ambient noise and generates a noise signal from the sensed ambient noise. The processing circuitry generates an anti-noise signal from the noise signal and adds the anti-noise signal to a game sound signal generated by the gaming machine to produce an output signal. The audio speaker is driven with the output signal.

BRIEF DESCRIPTION OF THE DRAWINGS

The foregoing and other advantages of the invention will become apparent upon reading the following detailed description and upon reference to the drawings.

Figure 1:
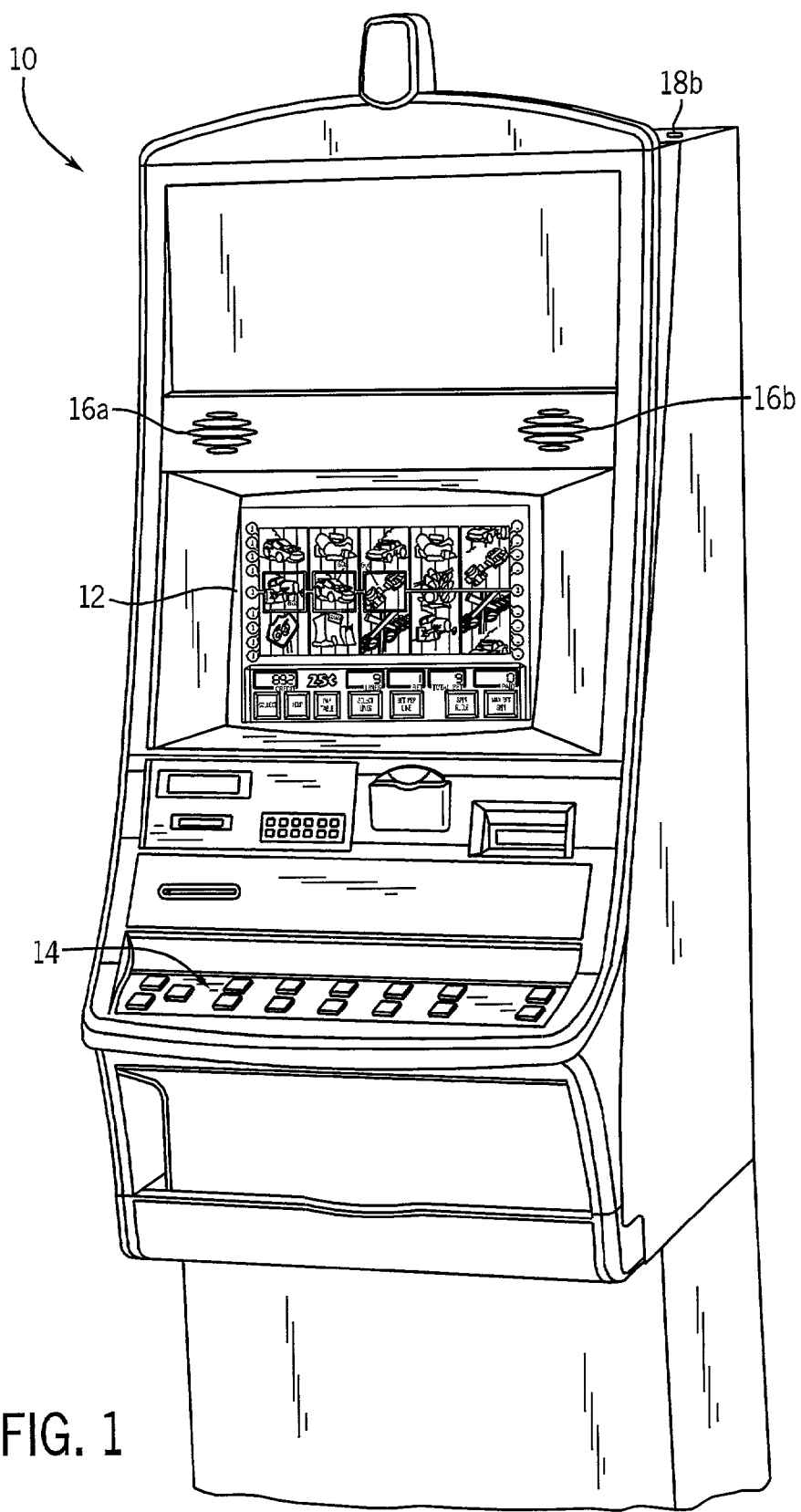
FIG. 1 is an isometric view of a gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 depicts a gaming machine 10 embodying the present invention. The gaming machine 10 is operable to play a game of chance such as mechanical or video slots, poker, blackjack, keno, or bingo. In response to a wager, a central processing unit (CPU) randomly selects a basic game outcome from a plurality of possible outcomes and visually represents the selected outcome on a display such as a video display 12. If the selected outcome corresponds to a winning outcome, the player is awarded a payout identified on a pay table for that winning outcome.

One or more of the basic game outcomes may trigger a bonus feature. The bonus feature may be played on the video display 12 or a secondary mechanical or video bonus indicator distinct from the video display 12. If the bonus feature is played on the video display 12, the bonus feature may utilize the display images of the basic game (e.g., slot reels in a slot game) or may replace the basic game images with bonus-specific images. The bonus feature may be interactive and require a player to make one or more selections to earn bonus amounts. Also, the bonus feature may depict one or more animated events and award bonus amounts based on an outcome of the animated events. Upon completion of the bonus feature, the gaming machine shifts operation back to the basic game.

The gaming machine 10 includes a plurality of push-buttons on a button panel 14 for operating the gaming machine. In addition, a touch screen may be mounted by adhesive, tape, or the like over a front surface of the display 12. The touch screen contains soft touch keys denoted by graphics on the underlying display 12 and used to operate the gaming machine 10. The touch keys may be used to implement the same functions as the push-buttons, as well as additional functions depending upon the level of player interaction demanded by the game. A player can then enable a desired function either by touching the touch screen at an appropriate touch key or by pressing an appropriate push-button on the button panel 14.

To enhance the entertainment value of the gaming machine 10, the gaming machine 10 plays entertaining game sounds coordinated with static and dynamic game images shown on the display 12. The game sounds are transmitted by one or more audio speakers 16 mounted to the machine cabinet. The speakers 16 preferably deliver the game sounds in stereo through a left channel speaker 16a and a right channel speaker 16b. The speakers 16 are preferably aimed in a frontal direction generally toward a player situated in front of the machine 10, but may alternatively be aimed in a side ways direction generally perpendicular to the frontal direction.

To allow the gaming machine 10 to enhance its game sounds by attenuating ambient noise in the gaming establishment, the gaming machine 10 includes one or more microphones 18 mounted to the cabinet. The microphones 18 preferably include a left microphone 18a (see FIG. 3) for detecting ambient noise at the left side of the machine and a right microphone 18b for detecting ambient noise at the right side of the machine. The microphones 18 generate analog noise signals from the sensed ambient noise. The noise signals are processed into anti-noise signals that are added to the game sounds prior to their transmission by the audio speakers 16. To prevent the game sounds from contributing to the anti-noise signals, the microphones 18 and the audio speakers 16 are physically isolated from each other.

Figure 2:
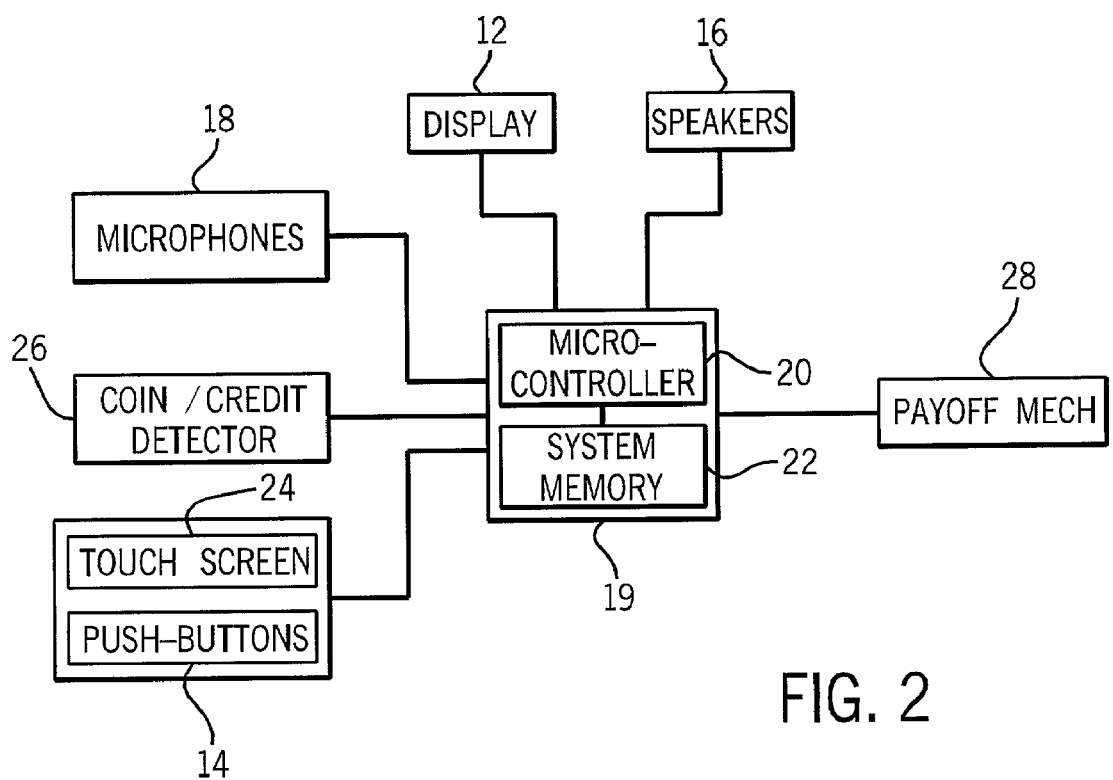
FIG. 2 is a block diagram of a control system suitable for operating the gaming machine.

FIG. 2 is a block diagram of a control system suitable for operating the gaming machine 10. The control system includes processing circuitry 19 with a microcontroller 20 and system memory 22. The memory 22 preferably comprises a removable flash memory and battery-backed random-access memory (RAM). The removable flash memory may be a compact flash storage medium and is used to store game-related data associated with the game of chance played on the gaming machine. The game-related data may, for example, include game code, math tables, a random number generator, and audiovisual resources (e.g., sounds and graphics). The player may select an amount to wager and other game play functions via the button panel 14 or the touch screen 24. The wager amount is signaled to the microcontroller 20 by a coin/credit detector 26. In response to the wager, the microcontroller 20 executes the game code which, based on a randomly determined outcome, selectively accesses the audiovisual resources to be shown on the video display 12 and played through the audio speakers 16. If the outcome corresponds to a winning outcome typically identified on a pay table, the microcontroller 20 instructs a payoff mechanism 28 to award a payoff for that winning outcome to the player in the form of coins or credits.

Figure 3:
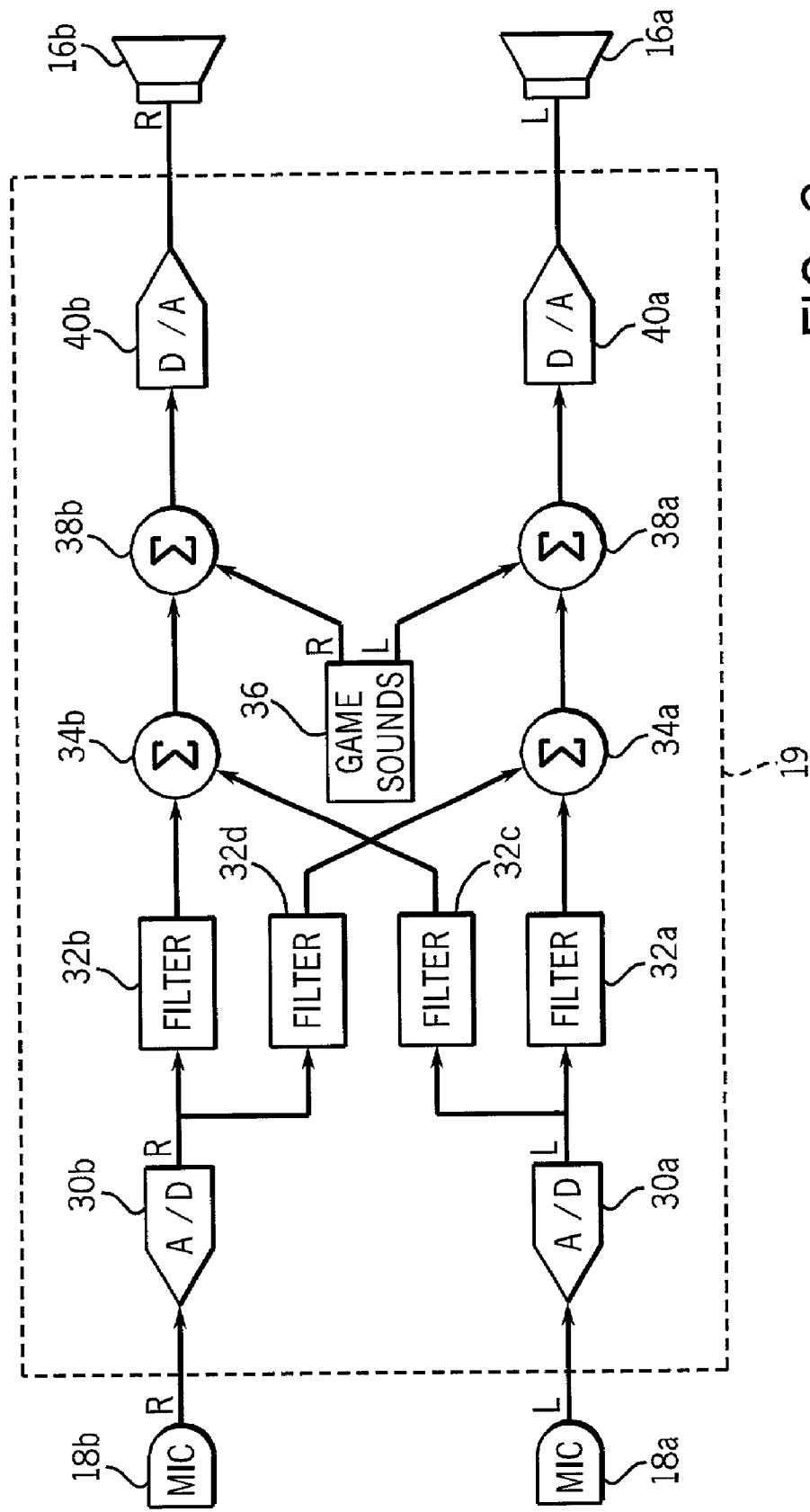
FIG. 3 is a schematic diagram of an ambient noise attenuation system utilized by the gaming machine.

FIG. 3 is a schematic diagram of an ambient noise attenuation system utilized by the gaming machine. The system includes the microphones 18, the processing circuitry 19, and the audio speakers 16. Each of the microphones 18 detects ambient noise and generates a respective analog noise signal from the sensed ambient noise. The left microphone 18a detects ambient noise at the left side of the machine, and the right microphone 18b detects ambient noise at the right side of the machine. Because the two microphones 18a and 18b may detect the same ambient noise albeit at slightly different times, the direction from which the ambient noise originates may be determined by considering (1) which microphone detects the noise first and (2) any time delay between when one microphone detects the noise and when the other microphone detects the same noise.

The processing circuitry 19 generates a respective anti-noise signal from each noise signal and adds the anti-noise signal to a respective game sound signal generated by the gaming machine to produce an output signal. Specifically, the analog left and right noise signals are digitized by respective analog-to-digital converters 30a and 30b and fed to respective pairs of optimized filters 32a,c and 32b,d. The filters 32a,b,c,d modify the frequency and phase content of the incoming digital noise signals to allow the sounds from the speakers to match (although inverted in phase) the sounds heard directly by the player. When the sounds from the speakers are combined at the player's ear(s) with the ambient noise from the surrounding environment, noise attenuation will result. The filters 32a,b,c,d optimize this attenuation over the range of audible frequencies. An adder 34a sums the filtered left noise signal from filter 32a and the filtered right noise signal from filter 32d to generate a left anti-noise signal. Similarly, an adder 34b sums the filtered right noise signal from filter 32b and the filtered left noise signal from filter 32c to generate a right anti-noise signal.

The digital game sounds for the game conducted on the gaming machine are stored in a game sounds memory 36. The memory 36 may be considered to be part of the system memory 22 shown in FIG. 2. Because the game sounds are to be delivered in stereo to the audio speakers 16, the game sounds include left channel sounds to be delivered to the left speaker 16a and right channel sounds to be delivered to the right speaker 16b. Prior to delivery to the speakers 16, however, the left and right game sound signals are altered by the respective left and right anti-noise signals. Specifically, an adder 38a sums the left anti-noise signal and the left game sound signal to produce a digital left output signal. Similarly, an adder 38b sums the right anti-noise signal and the right game sound signal to produce a digital right output signal.

The digital left and right output signals are converted to respective analog output signals by respective digital-to-analog converters 40a and 40b. The analog left and right output signals, in turn, drive the respective left and right audio speakers 16a and 16b to play sounds in stereo. From the player's perspective, the player can better hear the game sounds over the ambient noise produced by the surrounding environment because the sounds from the speakers include an anti-noise component that attenuates or at least partially cancels the ambient noise.

While the present invention has been described with reference to one or more particular embodiments, those skilled in the art will recognize that many changes may be made thereto without departing from the spirit and scope of the present invention.

Figure 4A:
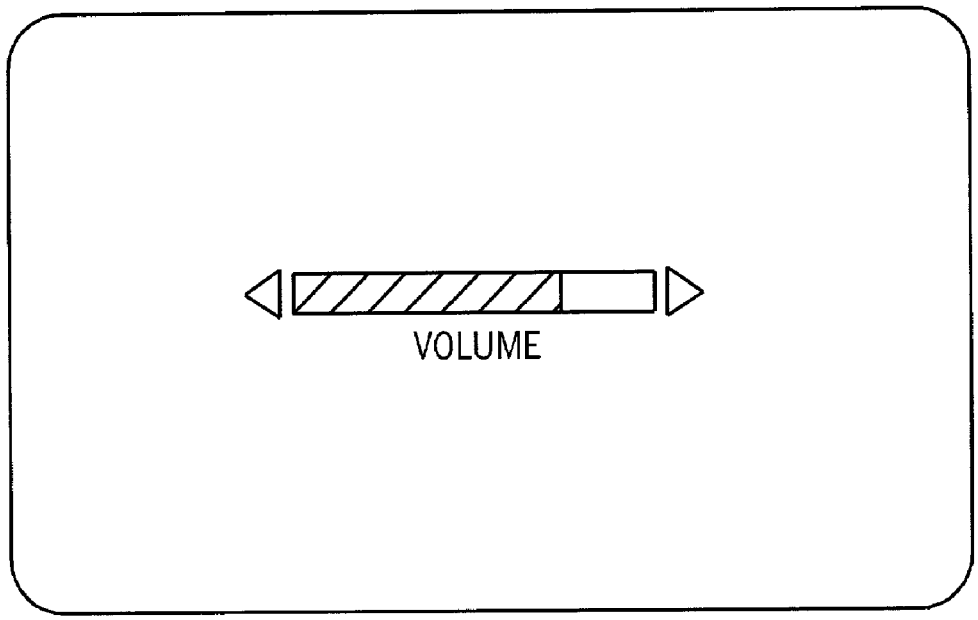
FIG. 4a is an illustration of a continuous volume control.
Figure 4B:
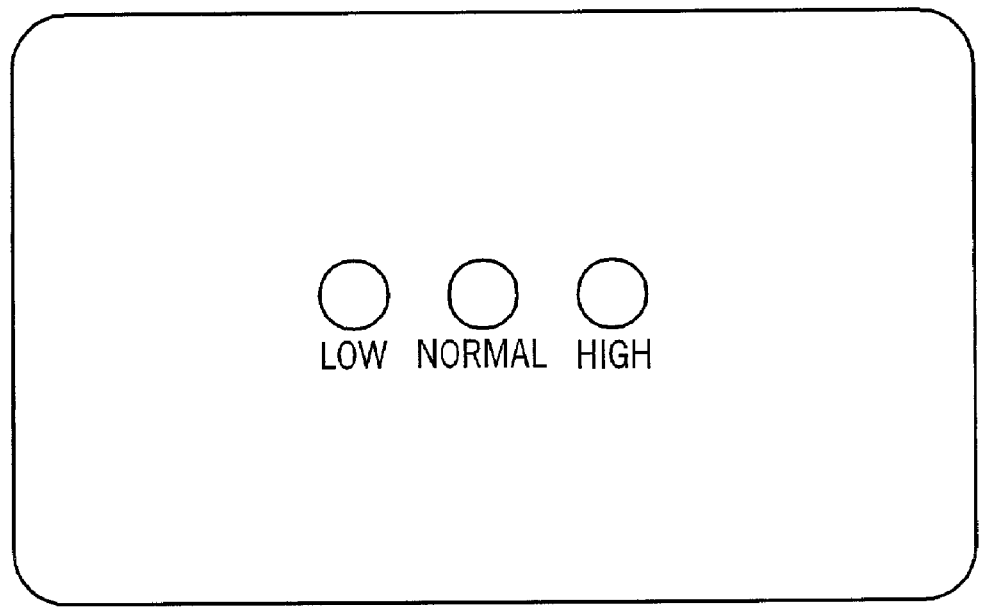
FIG. 4b is an illustration of a discrete volume control.

For example, to further enhance its game sounds, the gaming machine may offer an onscreen volume control that allows a player to personally adjust the volume of game sounds played by the audio speakers 16. In particular, in response to pressing a touch screen key called "volume control" or the like, the display 12 may provide a continuous volume control as shown in FIG. 4a or a discrete volume control as shown in FIG. 4b. With respect to the continuous volume control in FIG. 4a, the player presses the left arrow to decrease volume and the right arrow to increase volume. With respect to the discrete volume control in FIG. 4b, the player presses one of the keys (e.g., low, normal, or high) to directly select a particular volume level. After setting the volume, the player may return to the main game screen by pressing a touch screen key called "return to game." In one embodiment, the volume control is disabled when there are no play credits on the credit meter. The player can only adjust the volume after loading play credits onto the credit meter, and the volume automatically returns to a "normal"

level when the number of play credits on the credit meter returns to zero (e.g., because the player cashes out or loses all the credits).

Each of these embodiments and obvious variations thereof is contemplated as falling within the spirit and scope of the claimed invention, which is set forth in the following claims:

What is claimed is:

1. A method of conducting a wagering game on a gaming machine, the gaming machine being located in a casino-type gaming establishment, the method comprising:
   receiving a wager to play the wagering game;
   displaying a representation of a randomly selected outcome of the wagering game;
   awarding an award if the selected outcome is a winning outcome;
   playing game sounds coordinated with the displayed representation;
   detecting ambient noise in the gaming establishment with a microphone mounted to the gaming machine;
   generating a noise signal from the sensed ambient noise;
   processing the noise signal to generate an anti-noise signal; and
   driving an audio speaker with an output signal comprised of the anti-noise signal so as to enhance the game sounds.

2. The method of claim 1, further including isolating the microphone and the audio speaker from each other.

3. The method of claim 1, wherein the processing step includes filtering the noise signal.

4. The method of claim 1, further including adding the anti-noise signal to a game sound signal that generates the game sounds to produce the output signal, the output signal being comprised of the anti-noise signal and the game sound signal.

5. The method of claim 1, further including driving another audio speaker with a game sound signal that generates the game sounds.

6. The method of claim 5, further including isolating the microphone and the another audio speaker from each other.

7. A gaming machine for conducting a wagering game, the gaming machine being located in a casino-type gaming establishment, the machine comprising:
   means for receiving a wager to play the wagering game;
   a display for displaying a representation of a randomly selected outcome of the wagering game;
   means for awarding an award if the selected outcome is a winning outcome;
   means for detecting ambient noise in the gaming establishment and generating a noise signal from the sensed ambient noise;
   means for processing the noise signal to generate an anti-noise signal; and
   one or more audio speakers including an audio speaker for playing game sounds coordinated with the displayed representation and including the same or another audio speaker driven with an output signal comprised of the anti-noise signal so as to enhance the game sounds.

8. The gaming machine of claim 7, wherein the detecting means and the audio speaker are isolated from each other.

9. The gaming machine of claim 7, wherein the processing means filters the noise signal.

10. The gaming machine of claim 7, further including means for adding the anti-noise signal to a game sound signal that generates the game sounds to produce the output signal, the output signal being comprised of the anti-noise signal and the game sound signal.

11. A gaming machine for conducting a wagering game, the gaming machine being located in a casino-type gaming establishment, the machine comprising:
   an input device for receiving a wager to play the wagering game;
   a display for displaying a representation of a randomly selected outcome of the wagering game;
   an award device for awarding an award if the selected outcome is a winning outcome;
   a microphone for detecting ambient noise in the gaming establishment and generating a noise signal from the sensed ambient noise;
   processing circuitry for generating an anti-noise signal from the noise signal; and
   one or more audio speakers including an audio speaker for playing game sounds coordinated with the displayed representation and including the same or another audio speaker driven with an output signal comprised of the anti-noise signal so as to enhance the game sounds.

12. A method of conducting a wagering game on a gaming machine, the gaming machine being located in a casino-type gaming establishment, the method comprising:
   receiving a wager to play the wagering game;
   displaying a representation of a randomly selected outcome of the wagering game;
   awarding an award if the selected outcome is a winning outcome;
   playing game sounds coordinated with the displayed representation;
   detecting ambient noise in the gaming establishment and producing anti-noise sounds based thereon so as to enhance the game sounds.

13. An article of manufacture comprising a computer readable media storing instructions to direct a processor to
   record a wager to play a wagering game;
   randomly select an outcome of the wagering game;
   provide an award if the selected outcome is a winning outcome;
   play game sounds associated with the selected outcome; and
   produce anti-noise sounds based on ambient noise detected in a casino-type gaming establishment so as to enhance the game sounds.

14. An apparatus comprising:
   a processor operative to execute a program; embodied on a computer readable medium and
   a memory in communication with the processor, wherein the program is operative to record a wager to play a wagering game;
   randomly select an outcome of the wagering game;
   provide an award if the selected outcome is a winning outcome;
   play game sounds associated with the selected outcome; and
   produce anti-noise sounds based on ambient noise detected in a casino-type gaming establishment so as to enhance the game sounds.

* * * * *